E. G. TEMPLETON.
SEALING DEVICE FOR BATTERY TERMINALS.
APPLICATION FILED APR. 17, 1922.

1,432,806.

Patented Oct. 24, 1922.

INVENTOR
Edwin G. Templeton
BY
O.E.Bee.
ATTORNEY

Patented Oct. 24, 1922.

1,432,806

UNITED STATES PATENT OFFICE.

EDWIN G. TEMPLETON, OF AKRON, OHIO.

SEALING DEVICE FOR BATTERY TERMINALS.

Application filed April 17, 1922. Serial No. 553,551.

*To all whom it may concern:*

Be it known that I, EDWIN G. TEMPLETON, a citizen of the United States, residing at Akron, in the county of Summit and State of Ohio, have invented new and useful Improvements in Sealing Devices for Battery Terminals, of which the following is a specification.

My invention relates to sealing devices for battery terminals, and it has, for its primary object, the provision of a device which may be utilized to effectively seal the standard type of battery terminal against acid leaks.

It is well known that considerable difficulty is experienced in the use of storage batteries by reason of the acid leaking around the terminal posts, resulting in an attack upon the electrical connections, which in aggravated condition, necessitates expensive repairs. In spite of precautions taken by disposing a sealing material upon the top of the batteries, the leaking of acid is experienced after the battery has been subjected to jolts and jars, which are unavoidable in their ordinary application. The sealing material becomes cracked and permits the acid to creep out around the terminal posts, whereby the attendant chemical action ultimately destroys the necessary contact surface for the clamp which connects the ignition conductors thereto.

The principal object of my invention resides in providing a device which may be applied to the ordinary type of battery terminal to effectively seal it against acid leaks.

A further object of my invention is to provide a sealing device which may be inexpensively constructed, and which will be effective under ordinary circumstances during the life of the battery.

Heretofore it has been customary to resort to the application of grease and other such material to protect battery terminals from acid attack, but this method of avoiding the deleterious effect of such action is very unsatisfactory inasmuch as the grease is disagreeable to apply and must be frequently renewed, particularly in warm weather. Care must be so exercised in applying such material to the battery terminal as not to destroy the electrical connection between the terminal and the conductor secured thereto. Furthermore, such expedient does not remove the cause of the trouble, but merely aids in obviating an undesirable result.

A further object of my invention is to provide a sealing device which may be easily applied, and which will provide an effective seal so long as it is undisturbed by the removal of the clamp utilized to connect a conductor to the terminal, and which will not in any way effect the proper electrical contact of the component elements.

With these and other objects in view, my invention will be more fully described, illustrated in the drawings, in which corresponding numerals indicate like parts, and then fully pointed out in the appended claims.

In constructing a sealing device in accordance with my invention, I utilize a yieldable material, such as soft rubber, to form a washer of L-shape in cross-section, which is adapted to intimately engage a battery terminal. In order to provide means for clamping or insuring close engagement of the rubber with the battery terminal, a retaining member may be constructed, preferably of some relatively rigid material, of such shape as to partially confine the rubber washer. The two elements are fitted together and disposed about the battery terminal and the rubber is forced into close engagement with the terminal by pressing a conductor clamp into close engagement with the sealing device, the clamp being secured in place in the ordinary manner. By so forming the retaining member as to only partially enclose the yieldable material, the latter is permitted to form a more effective seal about the battery terminal.

Figure 1:
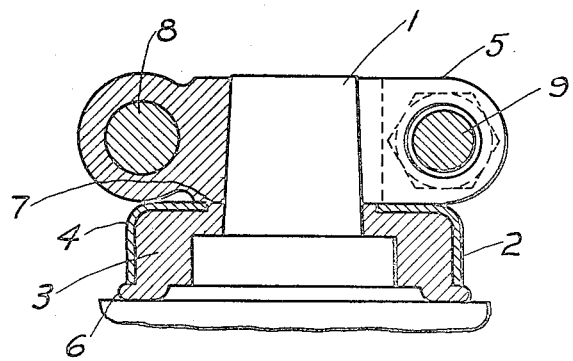
Fig. 1 is a side view, partially in elevation and partially in section, of a battery terminal having a sealing device applied thereto, which is constructed in accordance with my invention.
Figure 2:
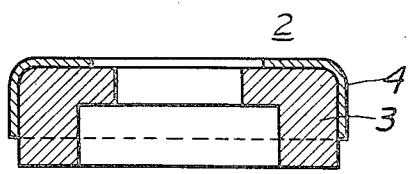
Fig. 2 is a transverse sectional view of the sealing device shown in Fig. 1.

In order to insure a clear understanding of my invention, reference may be had to the drawings, in Fig. 1 of which is shown a battery terminal 1 of the usual construction. A sealing device 2 is adapted to fit around the terminal 1, comprising a yieldable material 3 and a retaining member 4. As above set forth, the material 3 may be of any yieldable material unaffected by acid, but I prefer to utilize soft rubber because it is peculiarly adapted for the purpose. The form of the rubber washer 3 is clearly shown in Fig. 2 and is of L-shape in cross-section in order to closely engage the shouldered portion of the terminal 1. The opening provided in the washer 3 is of such diameter as to be slightly less than the diameter of the terminal 1, whereby a close engagement is insured. The retaining member 4 may be formed of any suitable metallic material and is preferably also of L-shape in cross-section, but of such dimensions as to only partially enclose the rubber element 3.

The advantage of this construction will be seen by its application illustrated in Fig. 1. For example, in applying the sealing device consisting of the two elements 3 and 4, they are fitted about the terminal 1, and a conductor clamp 5 of the usual type is pressed over the terminal and forced against the retaining member 4. By firmly pressing the clamp 5 against the sealing device, the soft rubber 3 is forced past the retaining member 4, as indicated at 6 and 7. The clamp 5 is, of course, of the usual construction, being a split ring adapted to engage a conductor 8 and to be secured to the terminal post by a bolt 9, which draws the split ends together.

Figure 3:
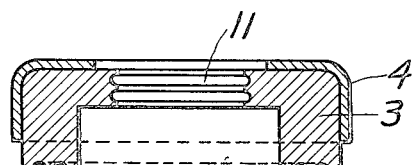
Fig. 3 is a similar view of a slight modification of the sealing device.

A modification of my invention is shown in Fig. 3, which contemplates grooving the working faces of the rubber washer 3, as indicated at 10 and 11. The purpose of providing such grooves in the working faces of the washer is to permit of displacement of the rubber and to trap any liquid that may be present on the terminal when the sealing device is applied. Although the grooves are not, by any means, essential to obtain an effective seal, nevertheless they may be utilized to some advantage in increasing the effectiveness of the device.

Figure 4:
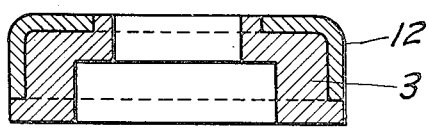
Fig. 4 is a transverse sectional view of another modified form of the sealing device comprehended by my invention.

In Fig. 4 another slight modification of my invention is shown which includes a retaining member 12 formed integrally with the rubber washer 3. For example, if the retaining member 12 is formed of a harder compound of rubber than the body portion 3, sufficient rigidity of the exterior surface may be attained to permit of forcing the clamp of the terminal thereagainst to insure an effective seal. This form of sealing device offers some advantages in that a single element is provided which presents no difficulty in construction inasmuch as the device may be readily molded, it merely being necessary to utilize different compounds of rubber in order to obtain the two degrees of flexibility that is desired.

It will be appreciated from the foregoing description that I have provided an effective sealing means for battery terminals which is relatively inexpensive to manufacture, and which may be utilized with the ordinary type of terminal without in any way changing its construction in order to permit of applying the device. Furthermore, it is not necessary to exercise any unusual care in applying the sealing device, as it may be as readily applied as a rubber washer upon a fruit jar, and accomplishes substantially the same result.

Although I have shown and specifically described a device constructed in accordance with my invention and set forth a plurality of modifications therefor, it will be obvious that many changes may be made in the construction of the device without departing from the spirit or scope of my invention, and I desire, therefore, that no limitations shall be imposed except such as are indicated in the appended claims.

What I claim is:

1. A sealing device for battery terminals comprising a yieldable material adapted to engage a terminal and means for compressing said material about the terminal.

2. A sealing device for battery terminals comprising a yieldable material adapted to engage a terminal and means for partially confining said material.

3. A sealing device for battery terminals comprising a yieldable material unaffected by acid adapted to engage a terminal and means for partially confining said material.

4. A sealing device for battery terminals comprising a yieldable material adapted to engage a terminal and a material having rigidity of form for partially confining the yieldable material.

5. A sealing device for battery terminals comprising a yieldable annular washer of L-shape in cross-section and a rigid retaining cup.

6. A sealing device for battery terminals comprising a rubber washer of L-shape in cross-section and a metallic retaining cup.

7. A sealing device for battery terminals comprising a rubber washer of L-shape in cross-section having a yieldable body portion and rigid exterior portion.

8. A sealing device for battery terminals comprising a relatively soft rubber washer of L-shape in cross-section and a metallic retaining member adapted to partially enclose the washer.

9. A sealing device for battery terminals comprising a rubber washer and a metallic retaining member.

10. A sealing device for battery terminals comprising a grooved rubber washer and a metallic retaining member.

In witness whereof I have hereunto signed my name in the presence of two subscribing witnesses.

EDWIN G. TEMPLETON.

Witnesses:
O. E. Err,
Wm. C. McCoy.